(12) United States Patent
Hsiao

(10) Patent No.: US 7,184,435 B2
(45) Date of Patent: Feb. 27, 2007

(54) METHOD FOR SETTING WIRELESS NETWORK DEVICES

(76) Inventor: Ju-Fang Hsiao, No 112, Tzu Yu Road, Hsinchu (TW)

( * ) Notice: Subject to any disclaimer, the term of this patent is extended or adjusted under 35 U.S.C. 154(b) by 976 days.

(21) Appl. No.: 10/261,693

(22) Filed: Oct. 2, 2002

(65) Prior Publication Data

US 2003/0198191 A1    Oct. 23, 2003

(30) Foreign Application Priority Data

Apr. 19, 2002    (TW) .............................. 91108160 A

(51) Int. Cl.
*H04L 12/28* (2006.01)
(52) U.S. Cl. ...................... 370/389; 370/465; 709/228; 709/237
(58) Field of Classification Search ...................... None
See application file for complete search history.

(56) References Cited

U.S. PATENT DOCUMENTS

| | | | | |
|---|---|---|---|---|
| 5,321,819 A * | 6/1994 | Szczepanek | ................ | 709/228 |
| 6,965,989 B1 * | 11/2005 | Strange et al. | ................. | 713/1 |
| 6,995,675 B2 * | 2/2006 | Curkendall et al. | ...... | 340/573.3 |
| 7,069,437 B2 * | 6/2006 | Williams | .................... | 713/166 |
| 7,111,062 B2 * | 9/2006 | Banerjee et al. | ............ | 709/224 |

* cited by examiner

Primary Examiner—Doris H. To
Assistant Examiner—Thien D. Tran
(74) Attorney, Agent, or Firm—Troxell Law Office, PLLC

(57) ABSTRACT

A method for setting wireless network devices aims at altering settings of at least one second wireless network device from a first wireless network device in a wireless transmission fashion. The method includes at least the following steps: starting a promiscuous mode on a wireless network adapter card located respectively in a first wireless network device and a second wireless network device; transmitting a search packet from the first wireless network device to the second wireless network device; returning an acknowledgement character (ACK) packet from the second wireless network device to the first wireless network device; the first wireless network device notifying an user based on the search ACK packet that setting for the second wireless network device may be started; the user ordering the first wireless network device to perform setting for the second wireless network device; the first wireless network device transmitting the setting packet to the second wireless network device; the second wireless network device returning setting ACK packet to the first wireless network device; the second wireless network device performing setting based on the setting packet; closing the network interface card in the second wireless network device; activating the network interface card in the second wireless network device; and the second wireless network device transmitting a Service Set Identification (SSID) information packet to the first wireless network device.

19 Claims, 2 Drawing Sheets

METHOD FOR SETTING WIRELESS NETWORK DEVICES

FIELD OF THE INVENTION

The present invention relates to a method for setting network devices and particularly a method for setting wireless network devices.

BACKGROUND OF THE INVENTION

The Internet has rapidly and deeply involved in people's life since it was invented. In the early days the communication between any two network devices was accomplished through line transmission. In recent years, in order to meet the increasing demands of wireless information transmission, network devices equipped with wireless information transmission capability have been develop and introduced. These days on the Internet it is possible to communicate any two network devices through a wireless transmission means.

In the present wireless network environment, any two wireless network devices (such as a first wireless network device and a second wireless network device) may be located in different networks with different Internet Protocol (IP) addresses. It is difficult for the first wireless network device to change settings of the second wireless network device through a wireless transmission approach.

In general, if the first wireless network device has the IP address of the second wireless network device, it is possible for the first wireless network device to change the settings of the second wireless network device by means of the Simple Network Management Protocol (SNMP) through the network, or the first wireless network device may change its own IP address to become same as the second wireless network device. Then the first wireless network device can communicate with the second wireless network device through the broadcast method and do the setting for the second wireless network device. FIG. 1 shows a menu example of setting IP related information in a conventional Windows operating system (developed by Microsoft Co. of U.S.A.).

However, after the IP address of the first wireless network device has been altered, users have to restart the first wireless network device to make the new setting of the IP address effective. It is an annoyance to most users. In addition, users have to have some basic network knowledge to do the setting. In the event that the first wireless network device does not have the IP address of the second wireless network device, it is not possible to communicate with the second wireless network device through SNMP or broadcast.

Therefore it is important to provide a method for setting wireless network devices that employs a simple manual setting procedure to enable a first wireless network device to communicate with a second wireless network device even if the IP address of the second wireless network device is unknown at the first wireless network device.

SUMMARY OF THE INVENTION

The object of the invention is to provide a method for setting wireless network devices that employs a simple manual setting procedure to do settings for wireless network devices even in the condition of no information of the IP addresses of the wireless network devices.

The method according to the invention aims at altering settings of at least one second wireless network device from a first wireless network device in a wireless transmission fashion. The method includes at least the following steps:

Start a promiscuous mode on a wireless network adapter card in a first wireless network device; activate a promiscuous mode on a wireless network adapter card in at least one second wireless network device; the first wireless network device transmits a search packet to the second wireless network device; the second wireless network device returns a search acknowledgement character (ACK) packet to the first wireless network device; the first wireless network device notifies the user all of the second wireless network devices that may be designated for setting based on the returned search ACK packet; the user orders the first wireless network device to perform setting for at least one of the designated second wireless network devices; the first wireless network device transmits setting packets to the designated second wireless network devices; all designated second wireless network devices return setting ACK packets to the first wireless network device; the user performs settings on all designated second wireless network devices based on the setting packets; the designated second wireless network devices close network interface cards located therein; the designated second wireless network devices activate the network interface cards located therein; all designated second wireless network devices transmit Service Set Identification (SSID) information packets to the first wireless network device.

The first wireless network device and the second wireless network devices set forth above may be respectively a user end computer and Wireless Presentation Gateway (WPG) devices. Packet transmission between the user end computer and the WPG devices may include a direct transmission in an ad hoc mode or an indirect transmission method in an infrastructure mode through a wireless network Access Point (AP).

In addition, the transmission of the search packet to the second wireless network device set forth above further includes the following steps: linking the first wireless network device to a multiple broadcast channel, and linking the second wireless network device to the multiple broadcast channel. The transmission of the packet between the first wireless network device and the second wireless network device set forth above is accomplished through the multiple broadcast channel. Moreover, in the aforesaid method, transmission of the SSID information packet to the first wireless network device is followed by the steps of: closing the promiscuous mode of the wireless adapter cards of all designated second wireless network devices, and closing the promiscuous mode of the wireless adapter card of the first wireless network device.

Furthermore, the setting packet mentioned above includes the following information: IP address or transmission mode (such as infrastructure mode or ad hoc mode) of the second wireless network device. The search ACK packet mentioned above includes location information of the second wireless network device. And the setting ACK packet mentioned above includes the location information of the second wireless network device.

The foregoing, as well as additional objects, features and advantages of the invention will be more readily apparent from the following detailed description, which proceeds with reference to the accompanying drawings.

DETAILED DESCRIPTION OF THE INVENTION

Conventional network adapter cards mostly support the promiscuous mode. In general, the promiscuous mode is closed on the network adapter cards. At present the most popular application for network adapter cards with promiscuous mode is for the network monitor program, also called Sniffer. The Sniffer activates the promiscuous mode on the network adapter cards, and receives and monitors all network packets. Hence once the promiscuous mode on the network adapter cards is started, the program can receive all information contained in the network packets. The invention aims at employing the function generated by the activation of the promiscuous mode to simplify manual setting procedures for wireless network devices.

Figure 1:
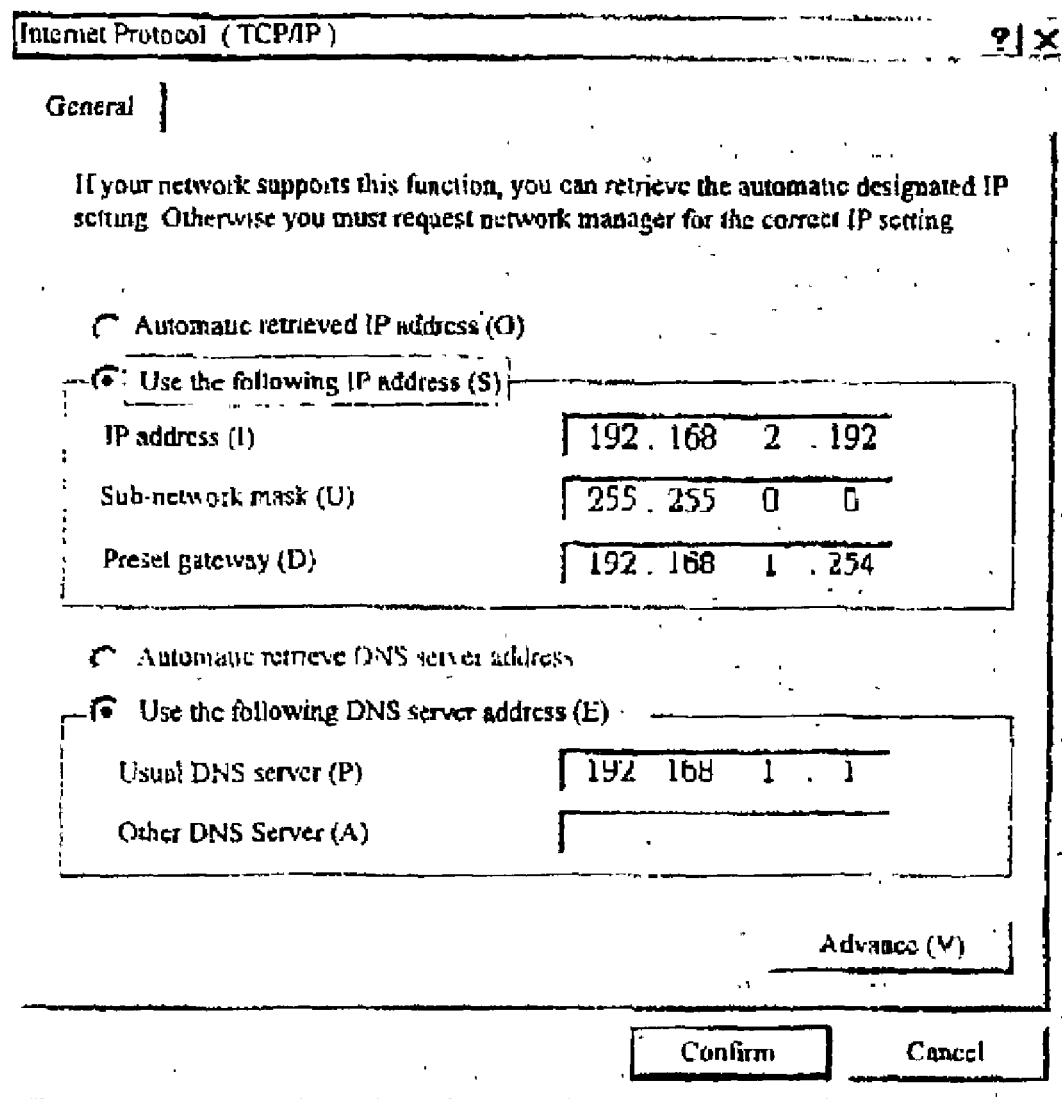
FIG. 1 is a menu picture for setting IP related information in a conventional Windows operating system.
Figure 2:
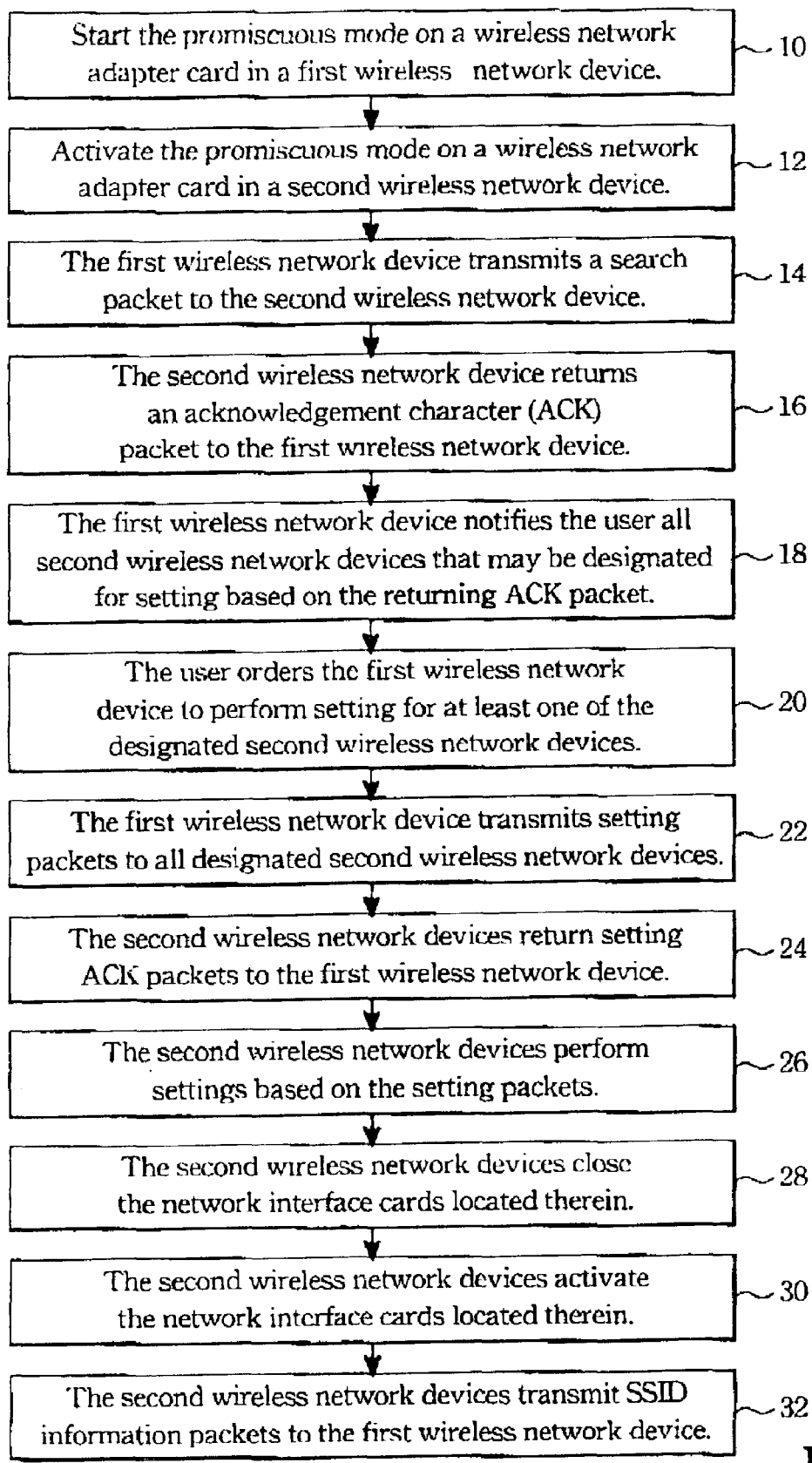
FIG. 2 is a process flow chart of setting wireless network devices according to an embodiment of the invention.

Refer to FIG. 2 for the process flow of setting wireless network devices according to an embodiment of the invention. The method of the invention employs a first wireless network device to alter settings of at least one second wireless network device through a wireless transmission means. The method includes at least the following steps:

First, start the promiscuous mode on a wireless network adapter card in a first wireless network device (step 10); then activate the promiscuous mode on the wireless network adapter card in at least one second wireless network device (step 12). Once the promiscuous mode of any second wireless network device is activated, the second wireless network device starts waiting to receive search packet information. Then the first wireless network device transmits a search packet to the second wireless network device (start 14); thereafter the second wireless network device returns a search acknowledgement character (ACK) packet to the first wireless network device (step 16). After the second wireless network device returns the search ACK packet to the first wireless network device, the second wireless network device starts waiting to receive setting packet information. Then the first wireless network device notifies the user all of the second wireless network devices that may be designated for setting based on the returned search ACK packet (step 18). Then the user orders the first wireless network device to perform setting for at least one of the designated second wireless network devices (step 20).

Thereafter, the first wireless network device transmits setting packets to all designated second wireless network devices (step 22). The designated second wireless network devices return setting ACK packets to the first wireless network device (step 24). After the first wireless network device receives the setting ACK packets, the first wireless network device starts waiting to receive Service Set Identification (SSID) information packets. Then all designated second wireless network devices perform settings based on the setting packets (step 26). Then all designated second wireless network devices close network interface cards located therein (step 28). Then all designated second wireless network devices activate the network interface cards (step 30); thereafter all designated second wireless network devices transmit SSID information packets to the first wireless network device (step 32).

The first wireless network device and the second wireless network devices set forth above may be respectively a user end computer and Wireless Presentation Gateway (WPG) devices. Packet transmission between the user end computer and the WPG devices may include a direct transmission in an ad hoc mode or an indirect transmission method in an infrastructure mode through a wireless network Access Point (AP).

When the packet transmission between the user end computer and the WPG devices is done in the infrastructure mode, the WPG devices not only can perform the function of wireless information presentation, they can also be linked to other wired or wireless networks through wireless access points to transmit other packets not related to the wireless information presentation to other wired or wireless networks (such as to receive e-mail or download data during presentation). In addition, the setting packet mentioned above includes the following information: the Internet Protocol (IP) address or transmission mode of the second wireless network devices (such as ad hoc mode or infrastructure mode). The aforesaid search ACK packet includes location address information of the second wireless network devices. The aforesaid setting ACK packet also includes the location address information of the second wireless network devices.

In addition, in the method set forth above, before the search packet is transmitted to the second wireless network devices, the following steps are processed: linking the first wireless network device to a multiple broadcast channel, and linking at least one second wireless network devices to the multiple broadcast channel. The packet transmission between the first wireless network device and the second wireless network devices is accomplished through the multiple broadcast channel. Moreover, in the aforesaid method, the transmission of the SSID information packet to the first wireless network device is followed by the steps of: closing the promiscuous mode on the wireless adapter cards of all the second wireless network devices designated by the user and closing the promiscuous mode on the wireless adapter card of the first wireless network device.

Furthermore, in the foregoing embodiment method, after the first wireless network device transmits the search packet to the second wireless network device (start 14), a waiting time may be set. In the event that the waiting time is over and the first wireless network device still does not receive the returning search ACK packet, the promiscuous mode on the wireless network adapter card in the first wireless network device is closed. Of course, before closing the promiscuous mode on the wireless network adapter card in the first wireless network device, it is allowable to request the user "whether to immediately close the promiscuous mode on the wireless network adapter card in the first wireless network device" or to "repeat processing step 14". By the same token, after the first wireless network device transmits the setting packet to all the second wireless network devices designated by the user (step 22), a waiting time may be set. In the event that the waiting time is over and the first wireless network device still does not receive the returning setting ACK packet, the promiscuous mode on the wireless network adapter card in the first wireless network device is closed. Of course, before closing the promiscuous mode on the wireless network adapter card in the first wireless network device, it is allowable to request the user "whether to immediately close the promiscuous mode on the wireless network adapter card in the first wireless network device" or to "repeat processing step 22".

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for setting wireless network devices that alters settings of at least one second wireless network device from a first wireless network device in a wireless transmission fashion, the method comprising at least steps of:

linking the first wireless network device to a multiple broadcast channel;

starting a promiscuous mode on a first wireless network adapter card in the first wireless network device;

activating another promiscuous mode on a second wireless network adapter card in the second wireless network device;

linking the second wireless network device to the multiple broadcast channel;

transmitting a search packet from the first wireless network device to the second wireless network device through the multiple broadcast channel;

returning a search acknowledgement character (ACK) packet from the second wireless network device to the first wireless network device through the multiple broadcast channel;

notifying an user by the first wireless network device based on the returned search ACK packet to start setting the second wireless network device;

ordering the first wireless network device by the user to perform setting for the second wireless network device;

transmitting a setting packet from the first wireless network device to the second wireless network device through the multiple broadcast channel;

returning a setting ACK packet from the second wireless network device to the first wireless network device through the multiple broadcast channel;

setting the second wireless network device based on the setting packet;

closing a network interface card in the second wireless network device;

activating the network interface card in the second wireless network device;

transmitting a Service Set Identification (SSID) information packet from the second wireless network device to the first wireless network device through the multiple broadcast channel;

closing the promiscuous mode on the second wireless network adapter card in the second wireless network device; and closing the promiscuous mode on the first wireless network adapter card in the first wireless network device.

2. The method of claim 1, wherein the first wireless network device and the second wireless network device are respectively a user end computer and a Wireless Presentation Gateway (WPG) device.

3. The method of claim 2, wherein the packet transmission between the user end computer and the WPG device includes a direct transmission in an ad hoc mode.

4. The method of claim 2, wherein the packet transmission between the user end computer and the WPG device includes an indirect transmission in an infrastructure mode through a wireless network access point.

5. The method of claim 1, wherein the setting packet includes information of an Internet Protocol address or a transmission mode of the second wireless network device.

6. The method of claim 5, wherein the transmission mode includes an infrastructure mode or an ad hoc mode.

7. The method of claim 1, wherein the search ACK packet includes information of the location of the second wireless network device.

8. The method of claim 1, wherein the setting ACK packet includes information of the location of the second wireless network device.

9. A method for setting network devices that alters settings of at least one second wireless network device from a first wireless network device in a wireless transmission fashion, the method comprising at least the steps of:

starting a promiscuous mode on a first wireless network adapter card in the first wireless network device;

activating another promiscuous mode on a second wireless network adapter card in the second wireless network device;

transmitting a search packet from the first wireless network device to the second wireless network device;

returning a search acknowledgement character (ACK) packet from the second wireless network device to the first wireless network device;

notifying an user by the first wireless network device based on the returned search ACK packet for all second wireless network devices designated to be set;

ordering the first wireless network device by the user to perform setting for at least one of the designated second wireless network devices;

transmitting setting packets from the first wireless network device to all of the designated second wireless network devices;

returning setting ACK packets from all of the designated second wireless network devices to the first wireless network device;

setting all of the designated second wireless network device based on the setting packet;

closing network interface cards in all of the designated second wireless network devices;

activating the network interface cards in all of the designated second wireless network devices; and transmitting Service Set Identification (SSID) information packets from all of the designated second wireless network devices to the first wireless network device.

10. The method of claim 9, wherein the transmitting Service Set Identification (SSID) information packets to the first wireless network device is followed by steps of:

closing the promiscuous mode on the second wireless network adapter cards in all of the designated second wireless network device; and closing the promiscuous mode on the first wireless network adapter card in the first wireless network device.

11. The method of claim 9, wherein the transmitting a search packet from the first wireless network device to the second wireless network device is preceded by steps of:

linking the first wireless network device to a multiple broadcast channel; and linking the at least one second wireless network device to the multiple broadcast channel.

12. The method of claim 11, wherein the packet transmission between the first wireless network device and the at least one second wireless network device is done through the multiple broadcast channel.

13. The method of claim 9, wherein the first wireless network device and the second wireless network device are respectively a user end computer and a Wireless Presentation Gateway (WPG) device.

14. The method of claim 13, wherein the packet transmission between the user end computer and the WPG device includes a direct transmission in an ad hoc mode.

15. The method of claim 13, wherein the packet transmission between the user end computer and the WPG device includes an indirect transmission in an infrastructure mode through a wireless network access point.

16. The method of claim 9, wherein the setting packet includes information of an Internet Protocol address or a transmission mode of the second wireless network device.

17. The method of claim 16, wherein the transmission mode includes an infrastructure mode or an ad hoc mode.

18. The method of claim 9, wherein the search ACK packet includes information of the location of the second wireless network device.

19. The method of claim 9, wherein the setting ACK packet includes information of the location of the second wireless network device.

* * * * *